United States Patent [19]
Frost

[11] 3,835,374

[45] Sept. 10, 1974

[54] METHOD AND APPARATUS FOR PROVIDING SPEED COMPENSATION FOR INFORMATION CONTAINING SIGNALS IN WHICH THE THRESHOLD LEVEL OF THE DETECTOR IS VARIED PROPORTIONAL TO SPEED

[75] Inventor: David S. Frost, Mississauga, Ontario, Canada

[73] Assignee: Transcanada Pipelines Limited, Toronto, Ontario, Canada

[22] Filed: Feb. 20, 1973

[21] Appl. No.: 334,127

[30] Foreign Application Priority Data
Feb. 13, 1973  Canada .............................. 163648

[52] U.S. Cl. .................................................. 324/37
[51] Int. Cl. .............................................. G01r 33/12
[58] Field of Search ...................... 324/37, 40, 34 R

[56] References Cited
UNITED STATES PATENTS

| | | |
|---|---|---|
| 2,882,488 | 4/1959 | Price et al. ........................ 324/37 |
| 3,328,681 | 6/1967 | Wood ................................. 324/37 |
| 3,437,917 | 4/1969 | Gunkel et al. ...................... 324/37 |
| 3,496,457 | 2/1970 | Proctor et al. ..................... 324/37 |
| 3,539,914 | 11/1970 | McClughan ........................ 324/37 |

*Primary Examiner*—Robert J. Corcoran
*Attorney, Agent, or Firm*—McCarthy & McCarthy

[57] ABSTRACT

Certain types of equipment, for example, certain types of instrument pigs used for detecting flaws in or other characteristics of pipelines, employ sensing devices that derive information-containing signals having an amplitude that varies in response to a characteristic of the device being scanned by the scanning device and undesirably in response to the speed of movement of the sensing device through the device being scanned. In order to speed compensate the information-containing signal so that it can be properly interpreted, a speed responsive signal that varies in amplitude in response to the speed of movement of the sensing device is derived and is used to vary the threshold level of the information-containing signal to permit portions of the information-containing signal that exceed in amplitude the amplitude of the speed responsive signal to be recorded and to prevent portions of the information-containing signal that are lesser in amplitude than the amplitude of the speed responsive signal from being recorded.

7 Claims, 11 Drawing Figures

PATENTED SEP 10 1974 3,835,374
SHEET 1 OF 2
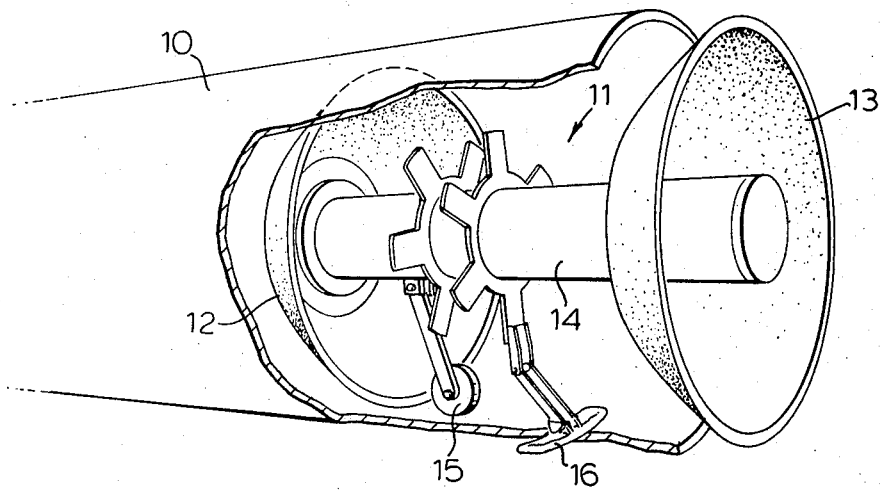
FIG. 1
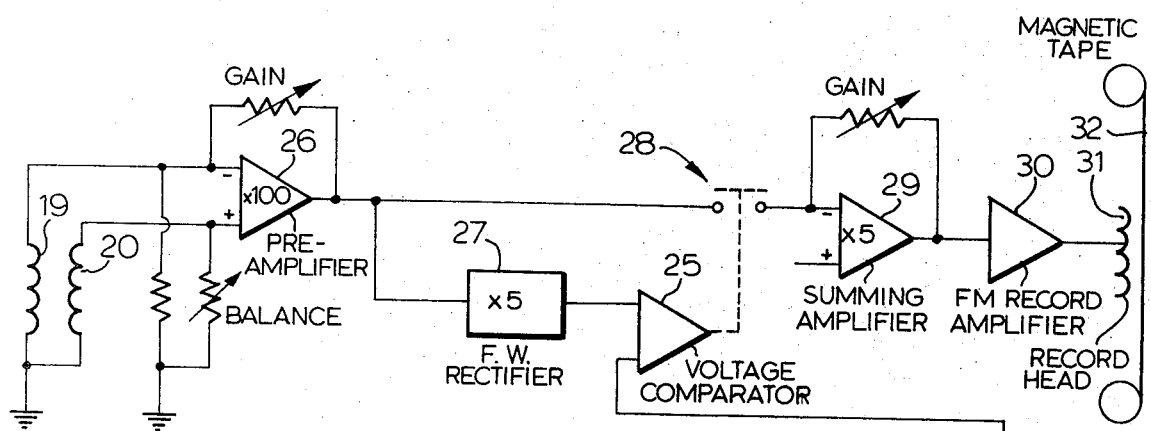
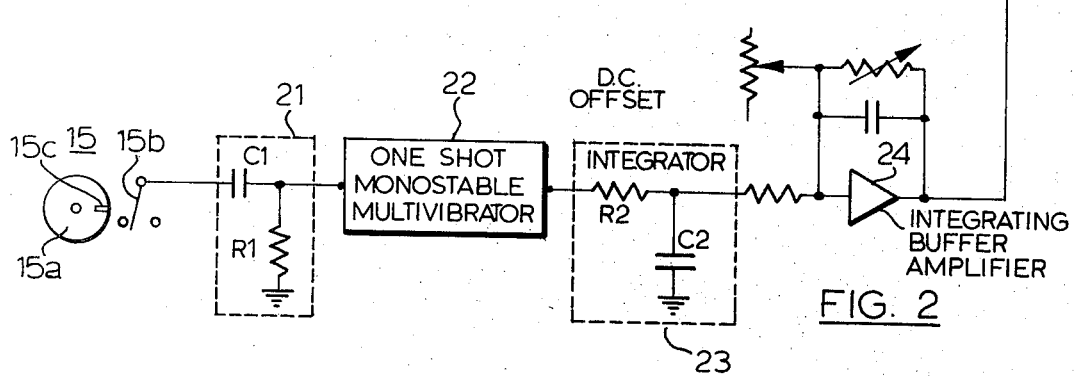
FIG. 2
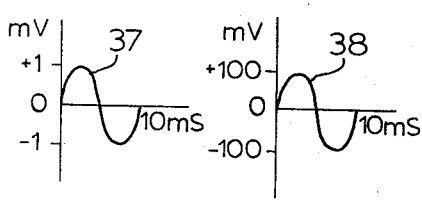
FIG. 3
FIG. 4
FIG. 5
FIG 6
FIG. 7

METHOD AND APPARATUS FOR PROVIDING SPEED COMPENSATION FOR INFORMATION CONTAINING SIGNALS IN WHICH THE THRESHOLD LEVEL OF THE DETECTOR IS VARIED PROPORTIONAL TO SPEED

BACKGROUND OF THE INVENTION

Devices known as instrument pigs are in common use for detecting and locating flaws or defects in or other characteristics of pipelines, e.g., natural gas transmission lines. The pig is inserted into the pipeline and moved therethrough. Means associated with the pig establish a magnetic field in the pipeline. A flaw, such as a crack or the like in the pipeline, creates an anomaly which is detected by magnetic flux sensing coils associated with the pig. The signal produced by the coils, which varies in amplitude in response to an anomaly, is recorded on a magnetic tape, for example. After processing of the tape and interpretation of the signals recorded thereon, the flaw can be located and repaired.

Certain instrument pigs in current use produce electrical signals that vary in amplitude with the speed of the pig as it progresses through the pipeline. In order that such signals can be interpreted correctly, it is necessary either to maintain a constant pig speed which, from a practical point of view, is extremely difficult to accomplish, or to modify the signals to compensate for any speed variations. For the most part the latter solution has been used, and is known to make a record of the speed of the pig and then, after a test run has been completed, utilize the same to compensate the recorded signals from the sensing coils for pig speed. The drawback of this solution is that it requires subsequent processing of the recorded tape for speed compensation.

A speed controlling system for a pipeline pig is disclosed in U.S. Pat. No. 3,495,546, Brown et al, issued Feb. 17, 1970. A system in which the recorded signals from the sensing coils are, after recording, compensated for pig speed variations is disclosed in U.S. Pat. No. 3,496,457, Proctor et al, issued Feb. 17, 1970.

SUMMARY OF THE INVENTION

In accordance with this invention, in a system wherein information-containing signals are generated that vary in amplitude with the size and type of defect, for example, being sensed and which also vary in amplitude in response to the speed of the sensing device, means are provided for speed compensating the information-containing signals in situ, so to speak. More specifically, a signal that varies in response to variations in speed of the sensing device is used to establish a threshold level that varies in magnitude with speed and which modifies the information-containing signals so that at high speeds only high amplitude information-containing signals are recorded, whereas at lower speeds lower amplitude information-containing signals are permitted to be recorded.

BRIEF DESCRIPTION OF THE DRAWING

This invention will become more apparent from the following detailed description, taken in conjunction with the drawings, in which:

FIG. 1 is a schematic view showing an instrument pig in a pipeline;

FIG. 2 is a circuit diagram of a system embodying the instant invention; and

FIGS. 3 to 11 inclusive are wave forms of the signals at various points in the system of FIG. 2.

Figure 8:
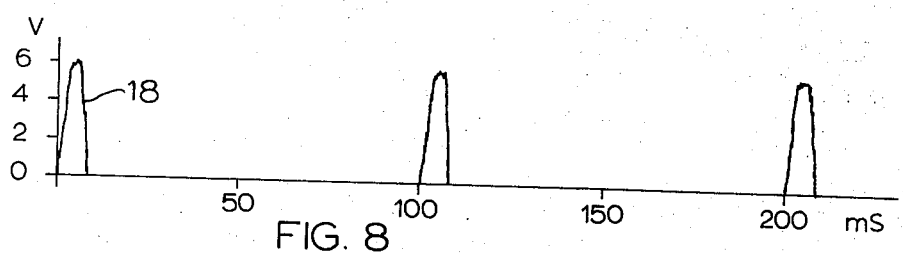

Referring first to FIG. 1, shown therein is a cross-section of a pipeline 10 in which is located an instrument pig 11 that is moving in the pipeline from right to left. Instrument pig 11 includes conventional, so-called scraper cups 12 and 13 and a housing 14 mounted and extending therebetween, the latter having housed therein electronic equipment such as is shown in FIG. 2. It also includes a device 15 for generating signals that vary in amplitude in proportion to the speed of movement of pig 11 through pipeline 10. This device also is shown in FIG. 2 and may be a rotating wheel 15a and a reed switch 15b. Wheel 15a bears against the inner surface of pipeline 10 and is rotated as pig 11 moves through the pipeline. Embedded in wheel 15a is a small permanent magnet 15c that actuates reed switch 15b once each revolution of the wheel. One of the fixed contacts of reed switch 15b is connected to a suitably power source (not shown), so that each time this fixed contact is engaged by the moveable contact of the reed switch, a pulse of the type shown at 18 in FIG. 8 is generated. Those skilled in the art will appreciate the device 15 is merely exemplary of a number of different devices that may be used, without departing from this invention, for generating a signal that varies in response to variations in the speed of pig 11 moving through pipeline 10.

Pig 11 also includes a sensing device 16 (FIG. 1). This sensing device may also be referred to as a sensor shoe and, in point of fact, a number of such sensor shoes will be employed so that the whole internal circumference of pipeline 10 can be scanned. However, for the sake of simplicity only some of the sensor shoes have been shown. Each shoe is suitably mounted on an arm extending from housing 14 and contacts the inner surface of pipeline 10. Within the sensor shoe are embedded sensing coils that may be differentially connected. These sensing coils are shown at 19 and 20 in FIG. 2. The sensor shoe includes a member which is generally U-shaped in cross-section and that constitutes a permanent magnet. This U-shaped member is composed of a suitable material such as polyurethane serving as a binder for ferromagnetic particles embedded therein, whereby this U-shaped member constitutes a flexible, permanent magnet. The sensing coils are embedded in a layer of polyurethane, for example, that is disposed between the two upstanding arms of the U-shaped member. The sensor shoe preferably has a radius of curvature that is greater (when the shoe is inside the pipeline) than the radius of curvature of the interior surface of pipeline 10. A spring is associated with the linkage that supports the sensor shoe. This spring forces the shoe into conformity with the interior surface of pipeline 10 to ensure the maintenance of surface contact between the shoe and pipeline. Those skilled in the art will appreciate, however, that many different types of sensing devices may be employed without departing from the instant invention. For example, the sensor shoe need not include a permanent magnet. The sensor shoe could simply serve as a vehicle for supporting the sensing coils and other means mounted elsewhere on the instrument pig and such as an electromagnet, for example, could be used to establish a magnetic field in pipeline 10. Sensing devices using other than sensing coils could be utilized as well. For example, Hall effect devices might be employed.

Referring now to FIG. 2, one system embodying the instant invention is shown therein, this system consisting of what could be referred to as an automatic threshold network and a pig signal processing network. The former consists of device 15, a differentiator 21 including, for example, a capacitor C1 and a resistor R1, a non-retriggerable one shot monostable multivibrator 22, an integrator 23 including, for example, a resistor R2 and a capacitor C2, an integrating buffer amplifier 24 and a voltage comparator 25 all connected as shown in the Figure. The latter consists of sensing coils 19 and 20, a preamplifier 26, a full wave rectifier 27, a suitable switch 28, which may be a field effect transistor, for example, an amplifier 29 and a tape recording system including an amplifier 30, a recording head 31 and magnetic tape 32, all of components 19, 20 and 26 to 31 being connected as shown in FIG. 2.

Figure 9:
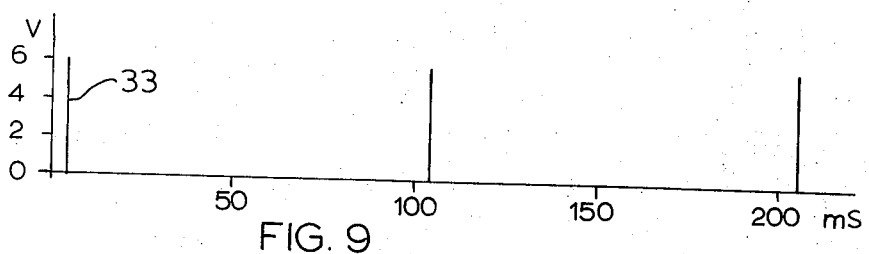
Figure 10:
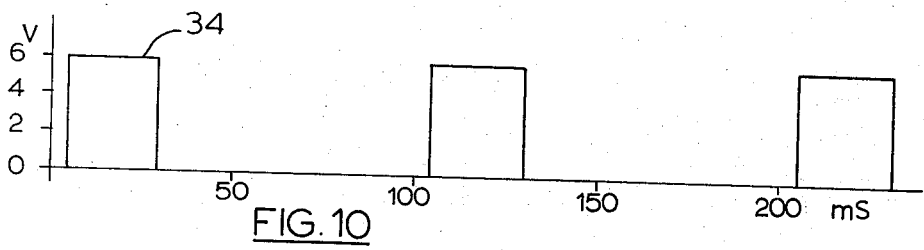
Figure 11:
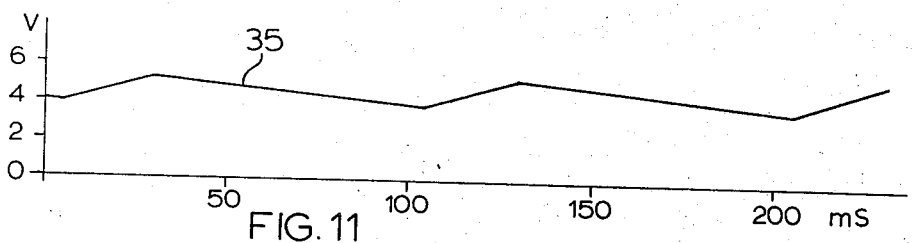

The basic function performed by the components designated 15 and 21 to 24 inclusive is to produce a DC signal that varies in magnitude with the speed of pig 11 as it passes through pipeline 10. As previously indicated, one pulse 18 (FIG. 8) is generated for each revolution of wheel 16, and hence the frequency of pulses 18 is directly proportional to the speed of pig 11. Pulses 18 are differentiated by differentiator 21, the output pulses of differentiator 21 being shown at 33 in FIG. 9. Pulses 33 are applied to the input terminal of monostable multivibrator 22 and trigger the same. The output of multivibrator 22 is pulses of constant width that vary in frequency with the speed of pig 11 and which are shown at 34 in FIG. 10. Pulses 34 are integrated by integrator 23, the output signal of which is shown at 35 in FIG. 11. The integrated signal 35 is applied to the input terminal of integrating buffer amplifier 24, and the output signal thereof, which is applied to one terminal of voltage comparator 25, is a smooth DC signal 36 (FIG. 6), the magnitude of which is directly proportional to the speed of pig 11. For purposes of explanation it will be assumed that signal 36 has a magnitude of +300 millivolts. Buffer amplifier 24 can be adjusted for gain (rate of change of threshold voltage with respect to speed) and also DC offset (threshold voltage at zero speed). A suitable combination of the two adjustments will vary the threshold voltage 36 with speed in the manner required.

Turning now to the pig signal processing network, it will be assumed for purposes of explanation that an information-containing signal is derived from sensing coils 19 and 20 that is in the form of a sine wave of 1 millivolt at 100 Hz. This signal is shown at 37 in FIG. 3. Preamplifier 26 may have a gain of, say, 100, so the output signal thereof is shown at 38 and is a sine wave of 100 millivolts at 100 Hz. The output signal of preamplifier 26 is applied to full wave rectifier 27, which may have a gain of, say, 5, so the output signal thereof will be as shown at 39 in FIG. 5, namely a full wave rectified signal having a peak value of +500 millivolts. This signal is applied to the other terminal of voltage comparator 25. The output signal 38 of preamplifier 26 is also applied via switch 28, when closed, to amplifier 29. For purposes of explanation it is assumed that amplifier 29 also has a gain of 5.

Signals 36 and 39 are compared in voltage comparator 25. The voltage comparator controls switch 28 such that when signal 39 is less than signal 36 in magnitude, switch 28 remains open, thereby preventing signal 38 from being amplified by amplifier 29 and recorded by the recorder. However, as soon as the magnitude of signal 39 exceeds the magnitude of signal 36, the output signal of voltage comparator 25 closes switch 28 permitting those portions of signal 38 which, after amplification by amplifier 29, exceed in absolute value the magnitude of signal 36, to be recorded. The signal that is recorded in this instance is shown in FIG. 7 and is constituted by the portions 40 of the indicated sine wave which, on each half cycle, are between the two vertical lines indicated in each half cycle, i.e., the portions of the sine wave having an absolute value greater than 300 volts. It will be appreciated that as the speed of pig 11 increases, the magnitude of signal 36 will increase, as will the amplitudes of signals 37, 38, 39 and 40. Similarly, as the speed of pig 11 decreases, the magnitude of signal 36 and the amplitudes of signals 37, 38, 39 and 40 will decrease so that a variable threshold level responsive to speed always is provided. At any given pig speed the threshold level should be set to be slightly higher than noise signals derived from sensing coils 19 and 20.

As was pointed out previously herein, only one sensor shoe 16 is shown in FIG. 1. In an embodiment of the invention that has been tested and operated satisfactorily 12 sensor shoes 16 were employed spaced around the internal circumference of pipeline 10. Each sensor shoe contained six differential pair of sensing coils 19 and 20, and each shoe scanned 30° of pipe circumference with each pair of coils then scanning 5° of circumference. All twelve shoes scanned the whole circumference of 360° with some slight overlap in coverage between the coils and shoes, the differential coil pairs having a slight offset and the 12 shoes being equally spaced in two adjacent rows with an overlap in scanning area. With this arrangement six differential preamplifiers 26 were employed for each shoe, one for each coil pair. Also associated with each sensor shoe were six full wave rectifier networks 27, six voltage comparators 25, six switches 28 and one amplifier 29 of the summing amplifier type having six individual inputs. Output signal 40 of summing amplifier 29 then is the sum of the six coil signals of one sensor shoe and is recorded on one channel of magnetic tape 32. The whole system was duplicated for each sensor shoe, thereby requiring 12 summing amplifiers 29 and a 12 channel magnetic tape so that the signals from all 12 shoes could be recorded on separate channels. The use of a large number of relatively small sensing coils, i.e., six per shoe rather than two per shoe, as have been used previously, makes it easier to detect flaw signals, while the gating arrangement described herein when used with a system of the type described in this paragraph provides a way to improve the signal to noise ratio of signals that have a low signal to noise ratio.

Those skilled in the art will appreciate that the essence of the invention disclosed herein is to provide a threshold level that automatically varies responsive to the speed of a sensing device and which is used to compensate the information-containing signal for speed variations. One convenient system for achieving this objective has been disclosed herein, but many different forms of hardware may be used to achieve the same result. Furthermore, while the invention is particularly applicable to instrument pigs for pipelines, it should be appreciated that it may be used in other systems where an information-containing signal is undesirably responsive to speed variations. It could be used, for example, in a system where a sensing device is scanning a moving sheet of material that varies in speed. Thus it is to be understood that where herein and in the claims reference is made to the speed of movement of a sensing device, this is with respect to the device being scanned and is to be construed as covering a stationary sensing device that scans a moving device of some sort, rather than just vice versa.

What is claimed is:

1. In combination with apparatus including a sensing device for deriving information-containing signals having an amplitude that varies both in response to the speed of movement of said sensing device and in response to a characteristic of the device being scanned by said sensing device, means for deriving a second signal that varies in amplitude in response to said speed of movement of said sensing device, means for recording said information-containing signals, switching means connected between said sensing device and said recording means, said switching means having first and second states, in said first state said switching means permitting said information-containing signal to be supplied to said recording means and recorded thereby, in said second state said switching means preventing said information-containing signal from being recorded by said recording means, a signal amplitude comparator for comparing said amplitude of said information-containing signal and said amplitude of said second signal, said signal amplitude comparator having an output terminal and providing at said output terminal an output signal when said amplitude of said information-containing signal exceeds a predetermined level related to said amplitude of said second signal, said output signal thus having a variable, speed-responsive threshold level, means for supplying said information-containing signal and second signal to said signal amplitude comparator for amplitude comparison and means connecting said output terminal and said switching means for supplying said output signal to said switching means to change the state thereof from said second state to said first state when said amplitude of said information-containing signal exceeds said predetermined level and for changing the state thereof from said first state to said second state when said amplitude of said information-containing signal is less than said predetermined level.

2. The combination according to claim 1 wherein said predetermined level is said amplitude of said second signal.

3. The combination according to claim 2 wherein said apparatus is a pipeline instrument pig.

4. The combination according to claim 2 wherein said means for supplying said information-containing signal to said amplitude comparator include a full wave rectifier and means connecting said rectifier between said sensing device and said amplitude comparator for full wave rectifying said information-containing signal before it is compared in amplitude with said second signal.

5. The invention according to claim 2 wherein said means for deriving said second signal comprise means for generating a signal having a frequency directly proportional to the speed of said sensing device and means for converting said signal so generated into a signal having an amplitude that varies directly proportional to said frequency.

6. A method for compensating an information-containing signal derived from a moving sensing device and that varies in amplitude both in response to the speed of movement of said sensing device and in response to a characteristic of the device being scanned for variations in said speed of movement of said sensing device in a system which includes an output terminal at which the speed compensated information-containing signal is obtained which comprises deriving a second signal that varies in amplitude in response to said speed of movement of said sensing device, comparing the amplitudes of said information-containing signal and said second signal to generate an output signal when said amplitude of said information-containing signal exceeds a predetermined level related to said amplitude of said second signal and supplying said output signal to switching means having first and second states and connected in said system between said sensing device and said output terminal to change the state thereof from said second state to said first state when said amplitude of said information-containing signal exceeds said predetermined level and to change the state thereof from said first state to said second state when said amplitude of said information-containing signal is less than said predetermined level, in said first state said switching means permitting said information-containing signal to be supplied to said output terminal and in said second state said switching means preventing said information-containing signal from being supplied to said output terminal.

7. A method according to claim 6 wherein said predetermined level is said amplitude of said second signal.

* * * * *